(12) United States Patent
Yan

(10) Patent No.: US 12,722,177 B1
(45) Date of Patent: Sep. 1, 2026

(54) SHOWER SUPPORT ARM ASSEMBLY

(71) Applicant: Xiamen Galenpoo Kitchen & Bathroom Technology Co., Ltd., Xiamen (CN)

(72) Inventor: Xiaoling Yan, Xiamen (CN)

(73) Assignee: Xiamen Galenpoo Kitchen & Bathroom Technology Co., Ltd., Xiamen (CN)

( * ) Notice: Subject to any disclaimer, the term of this patent is extended or adjusted under 35 U.S.C. 154(b) by 0 days.

(21) Appl. No.: 19/393,625

(22) Filed: Nov. 19, 2025

(30) Foreign Application Priority Data

Nov. 12, 2025 (CN) ........................ 202522400206.X

(51) Int. Cl.

| | |
|---|---|
| ***E03C 1/06*** | (2006.01) |
| ***B05B 15/62*** | (2018.01) |
| ***B05B 15/68*** | (2018.01) |
| ***E03C 1/02*** | (2006.01) |
| ***E03C 1/04*** | (2006.01) |
| ***F16K 27/00*** | (2006.01) |
| ***F16K 27/06*** | (2006.01) |

(52) U.S. Cl.
CPC .............. *B05B 15/68* (2018.02); *B05B 15/62* (2018.02); *E03C 1/025* (2013.01); *E03C 1/0408* (2013.01); *F16K 27/00* (2013.01); *F16K 27/06* (2013.01); *F16K 27/065* (2013.01); *E03C 2001/026* (2013.01); *E03C 2201/30* (2013.01); *E03C 2201/80* (2013.01); *Y10T 137/86871* (2015.04); *Y10T 137/87708* (2015.04); *Y10T 137/87877* (2015.04); *Y10T 137/87885* (2015.04); *Y10T 137/87909* (2015.04); *Y10T 137/9464* (2015.04)

(58) Field of Classification Search
CPC ... E03C 1/06; E03C 1/066; B05B 1/18; B05B 15/62; B05B 15/628; B05B 15/68; A47B 96/061; F16B 7/1418; F16M 2200/028; F16M 13/022; B23Q 1/285; A47G 1/1686; A47G 1/1613; A47H 1/144; B60N 2/0818; F16C 2226/16; F16C 26/00; F16C 26/05; F16C 29/10; F16C 29/084
USPC ..................... 248/477, 316.5, 295.11, 287.1; 403/109.5
See application file for complete search history.

(56) References Cited

U.S. PATENT DOCUMENTS

| | | | | |
|---|---|---|---|---|
| 2003/0029986 A1* | 2/2003 | Zuller | .................... | A47G 1/164 248/476 |
| 2012/0286070 A1* | 11/2012 | Lev | ....................... | E03C 1/0408 239/380 |
| 2024/0399393 A1* | 12/2024 | Hofman | .................. | B05B 1/185 |

FOREIGN PATENT DOCUMENTS

| | | |
|---|---|---|
| CN | 221567340 U | 8/2024 |
| CN | 119412425 A | 2/2025 |
| CN | 223004304 U | 6/2025 |

* cited by examiner

*Primary Examiner* — Tuongminh N Pham
(74) *Attorney, Agent, or Firm* — JEEN IP LAW, LLC

(57) ABSTRACT

A shower support arm assembly includes a support arm body with an adjustment slot extending along a first direction. A sliding adjustment seat is disposed in the slot and can reciprocate along the first direction. At least one rack is fixed on an inner wall of the slot. A paired engagement structure on the adjustment seat engages with the rack in a locked state to position the seat, and moves away from the rack in an unlocked state to release the engagement, allowing the seat to move. This enables a showerhead installed on the seat to have its height adjusted by sliding along the slot. The engagement with the rack after adjustment ensures a stable and reliable position, preventing slippage or displacement.

14 Claims, 10 Drawing Sheets

SHOWER SUPPORT ARM ASSEMBLY

TECHNICAL FIELD

This application relates to the technical field of bathroom products, and in particular to a shower support arm assembly.

BACKGROUND

Existing top sprays and showerheads are generally connected to a water outlet joint on a wall through a shower support arm. In the prior art, the heights of some top sprays and showerheads are fixed and cannot be adjusted according to the height of a user, such as an overhead shower with a filter and a handheld showerhead disclosed in Chinese patent No. CN119073815A. Although the height of some showerheads can be adjusted, the adjustment structure is usually clamped and fixed on a shower column, resulting in a poor fixing effect, for example, a shower column assembly disclosed in Chinese patent No. CN113316674B.

SUMMARY

An objective of this application is to provide a shower support arm assembly having the advantages of convenient and stable adjustment of the height of the showerhead.

To achieve the above objective, the solution of this application is:

The shower support arm assembly includes:

a support arm body having an adjustment slot extending along a first direction;

- a sliding adjustment seat disposed in the adjustment slot and capable of reciprocating along the first direction;
- at least one rack disposed on an inner wall of the adjustment slot, the at least one rack being a fixed element; and
- a paired engagement structure disposed on the adjustment seat, where in a locked state, an engagement of the paired engagement structure with the rack is achieved to position the adjustment seat, and in an unlocked state, the paired engagement structure moves away from the rack to release the engagement, thereby allowing the adjustment seat to move along the first direction.

Further, the paired engagement structure includes a first engagement component and a second engagement component disposed opposite to each other, and two such racks are disposed opposite to each other in the adjustment slot.

In the locked state, respective engagements of the first engagement component and the second engagement component with the two racks are achieved, and in the unlocked state, the first engagement component and the second engagement component respectively move away from the racks to synchronously release the at least two engagements.

Further, an open side of the adjustment slot forms a limiting guide edge and slidably connects with a limiting slot in the adjustment seat to prevent the adjustment seat from detaching outward in a direction away from the adjustment slot.

Further, the paired engagement structure further includes a sliding connection seat, two release buttons, and a locking spring.

The sliding connection seat has a sliding connection block inserted and slidably connected in the adjustment slot, and the sliding connection block is located between the two racks.

The first engagement component and the second engagement component are spaced apart and installed on two sides of the sliding connection block close to the racks, and are capable of reciprocating along a second direction between the sliding connection block and the racks, the second direction being perpendicular to the first direction.

One side of the first engagement component and one side of the second engagement component that face away from each other are respectively provided with limiting teeth movably engaging with the racks, one side of the first engagement component and one side of the second engagement component that face each other are provided with the locking spring, and the locking spring provides an elastic force to separate the first engagement component and the second engagement component.

The release buttons are installed on a surface of the sliding connection seat and have drive parts linked to the first engagement component and the second engagement component. When the release buttons are pressed, the drive parts drive the first engagement component and the second engagement component to approach each other.

Further, the two release buttons are symmetrically disposed up and down and spaced apart at two ends of the first direction between the first engagement component and the second engagement component, for synchronously linking the first engagement component and the second engagement component to approach each other.

Further, the sliding connection seat has a movement chamber, the sliding connection block is provided with side openings communicating with the movement chamber along two sides of the second direction, and one side of the sliding connection seat away from the sliding connection block is provided with release openings communicating with the movement chamber along two sides of the first direction.

The first engagement component and the second engagement component are both installed in the movement chamber and have the respective limiting teeth protruding from the two side openings, the first engagement component and the second engagement component respectively have component bodies limited in the movement chamber, the locking spring is disposed between the two component bodies, and two ends of each of the component bodies along the first direction are respectively provided with guide inclined surfaces.

The two release buttons are both installed in the movement chamber and each include a button protruding from the release opening to a surface of the sliding connection seat and the drive part located in the movement chamber, a notch is provided on a side of the drive part close to the first engagement component and the second engagement component, and left and right sides of the notch respectively have drive inclined surfaces that engage with the guide inclined surfaces.

Further, a side of the adjustment seat away from the paired engagement structure is provided with a showerhead connection part, the showerhead connection part includes a fixed seat, a movable head, and a magnetic attraction assembly, the fixed seat has one side detachably connected to a side of the paired engagement structure away from the adjustment slot and the other side provided with a movement hole, one side of the movable head is provided with a ball head, the ball head is rotatably assembled in the movement hole, the other side of the movable head is installed with the magnetic attraction assembly, and the magnetic attraction assembly is configured to movably attract and fix a showerhead.

Further, the support arm body includes a first support arm and a second support arm, one end of the first support arm and one end of the second support arm are hinged to each other, the other end of the first support arm away from the second support arm is provided with a top spray connection port, and the adjustment slot is disposed in the second support arm.

Further, an upper end of the second support arm is hinged to one end of the first support arm, and a top waterway communicating with the top spray connection port is disposed inside the first support arm.

A rear side of an upper part of the second support arm is provided with a water inlet base, the second support arm is further provided with an inlet waterway, a waterway switching chamber, a first waterway, and a second waterway therein, the inlet waterway enables communication between the water inlet base and the waterway switching chamber, the waterway switching chamber is disposed in a lower part of the second support arm and is installed with a switching control valve, and the switching control valve rotates to control the waterway switching chamber to simultaneously communicate with the first waterway and the second waterway or selectively communicate with the first waterway or the second waterway, the first waterway communicates upward with the top waterway, and the second waterway communicates with a lower water outlet disposed in the lower part of the second support arm.

Further, the second support arm includes a front shell, an adjustment slot bottom plate, a waterway connection plate, a waterway connection part, and a rear cover plate.

A front side of the front shell is provided with the adjustment slot, the adjustment slot bottom plate covers and seals a rear side of the adjustment slot, and the racks are integrally formed on left and right sides of the adjustment slot.

The waterway connection plate and the waterway connection part are connected up and down and installed on a front side of the rear cover plate, and the rear cover plate covers a rear side of the front shell and encloses the waterway connection plate and the waterway connection part.

An upper inlet waterway and an upper first waterway extending up and down and separated left and right are formed between the rear cover plate and the waterway connection plate, a lower inlet waterway and a lower first waterway extending up and down and spaced left and right are formed between the rear cover plate and the waterway connection part, the upper inlet waterway and the lower inlet waterway communicate to form the inlet waterway, and the upper first waterway and the lower first waterway communicate to form the first waterway.

The waterway switching chamber and the second waterway located below the waterway switching chamber are also disposed in the waterway connection part, and the waterway switching chamber has a first hole, a second hole, and a third hole that respectively communicate with the lower inlet waterway, the lower first waterway, and the second waterway, where the second hole and the third hole are spaced apart along a circumferential direction of the waterway switching chamber.

The switching control valve includes a valve body and a switch, the valve body is rotatably installed in the waterway switching chamber, the switch is installed on a surface of the second support arm and connected to the valve body, and a circumferential wall of the valve body has a sealing part that movably blocks the second hole and the third hole.

Further, a back of the support arm body is integrally provided with a protruding water inlet base, and the water inlet base is connected to a wall water inlet pipe and fixes the support arm body.

With the use of the above technical solution, a water outlet device such as a showerhead can be placed and installed on a front side of the adjustment seat of this application, and the position of the showerhead can be adjusted through reciprocating and sliding in the adjustment slot along the first direction. The paired engagement structure engages with the rack in the adjustment slot to fixedly limit the position of the showerhead. This achieves an adjustable position of the showerhead and ensures a reliable and stable position of the showerhead, such that the showerhead is not prone to downward slippage or displacement.

Figure 1:
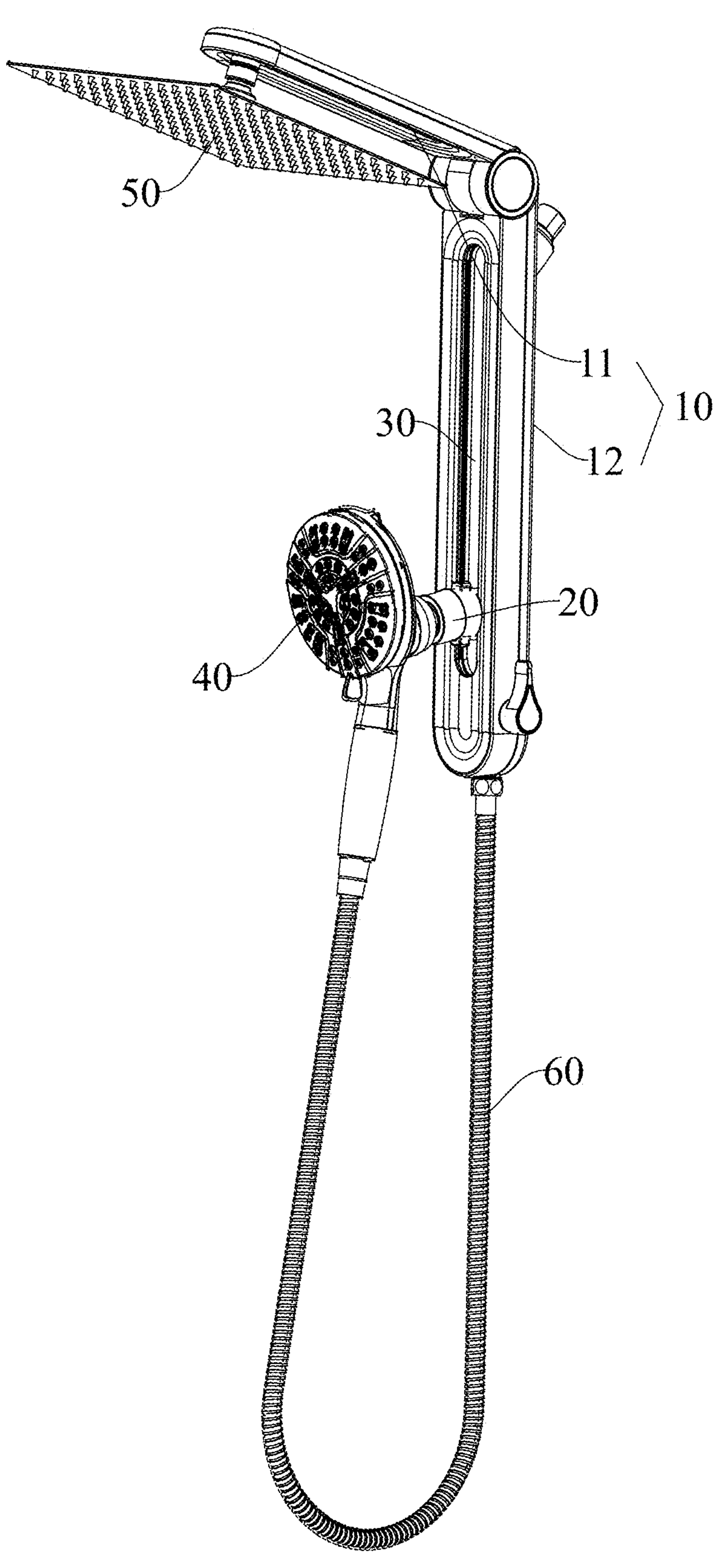
FIG. 1 is a perspective view according to an embodiment of this application.

Description of reference numerals: support arm body 10, first support arm 11, top spray connection port 111, top waterway 112, second support arm 12, water inlet base 121, inlet waterway 122, upper inlet waterway 1221, lower inlet waterway 1222, waterway switching chamber 123, first hole 1231, second hole 1232, third hole 1233, first waterway 124, upper first waterway 1241, lower first waterway 1242, second waterway 125, switching control valve 126, valve body 1261, switch 1262, sealing part 1263, lower water outlet 127, front shell 13, adjustment slot bottom plate 14, waterway connection plate 15, waterway connection part 16, rear cover plate 17;

adjustment seat 20, paired engagement structure 21, first engagement component 211, second engagement component 212, sliding connection seat 213, sliding connection block 2131, movement chamber 2132, side opening 2133, release opening 2134, protrusion 2135, friction pad 2136, release button 214, button 2141, locking spring 215, limiting tooth 216, drive part 217, notch 2171, drive inclined surface 2172, component body 218, guide inclined surface 2181, limiting slot 22, showerhead connection part 23, fixed seat 231, movement hole 2311, movable head 232, ball head 2321, magnetic attraction assembly 233;

adjustment slot 30, rack 31, limiting guide edge 32;

showerhead 40, top spray 50, and hose 60.

DETAILED DESCRIPTION OF THE EMBODIMENTS

To make the objective, technical solutions, and advantages of the embodiments of this application clearer, the technical solutions in the embodiments of this application will be clearly and completely described below with reference to the drawings in the embodiments of this application. Obviously, the described embodiments are some embodiments of this application, rather than all embodiments. The components of the embodiments of this application generally described and shown in the drawings herein can be arranged and designed in different configurations.

As shown in FIG. 1 to FIG. 10, the embodiments provide a shower support arm assembly, including:

- a support arm body 10 having an adjustment slot 30 extending along a first direction;
- a sliding adjustment seat 20 disposed in the adjustment slot 30 and capable of reciprocating along the first direction;
- at least one rack 31 disposed on an inner wall of the adjustment slot 30, the at least one rack 31 being a fixed element; and
- a paired engagement structure 21 disposed on the adjustment seat 20, where in a locked state, the paired engagement structure 21 engages with the rack 31 to position the adjustment seat 20, and in an unlocked state, the paired engagement structure 21 moves away from the rack 31 to release the engagement, thereby allowing the adjustment seat 20 to move along the first direction.

Thereby, the adjustment seat 20 can be used to place and install a water outlet device such as a showerhead 40, and the position of the showerhead 40 can be adjusted by sliding in the adjustment slot 30 along the first direction. The first direction in these embodiments may be an up-down vertical direction, but is certainly not limited thereto. Thus, after the adjustment seat 20 slides up and down, the paired engagement structure 21 can engage with the rack 31 in the adjustment slot 30 to fixedly limit the position of the showerhead 40. This achieves an adjustable height and position of the showerhead 40 and ensures a reliable and stable position of the showerhead 40, such that the showerhead is not prone to downward slippage or displacement.

Figure 4:
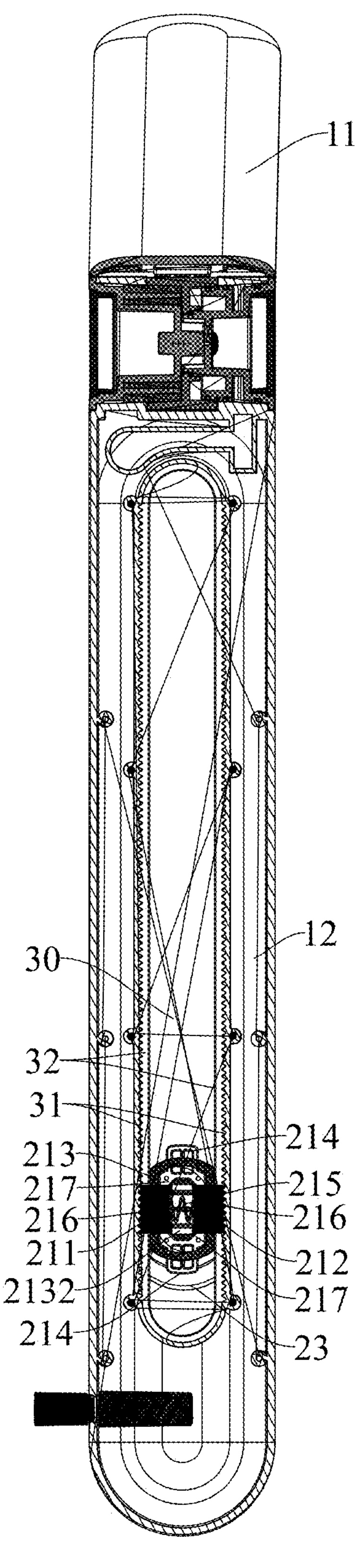
FIG. 4 is a partial cross-sectional view according to an embodiment of this application.
Figure 5:
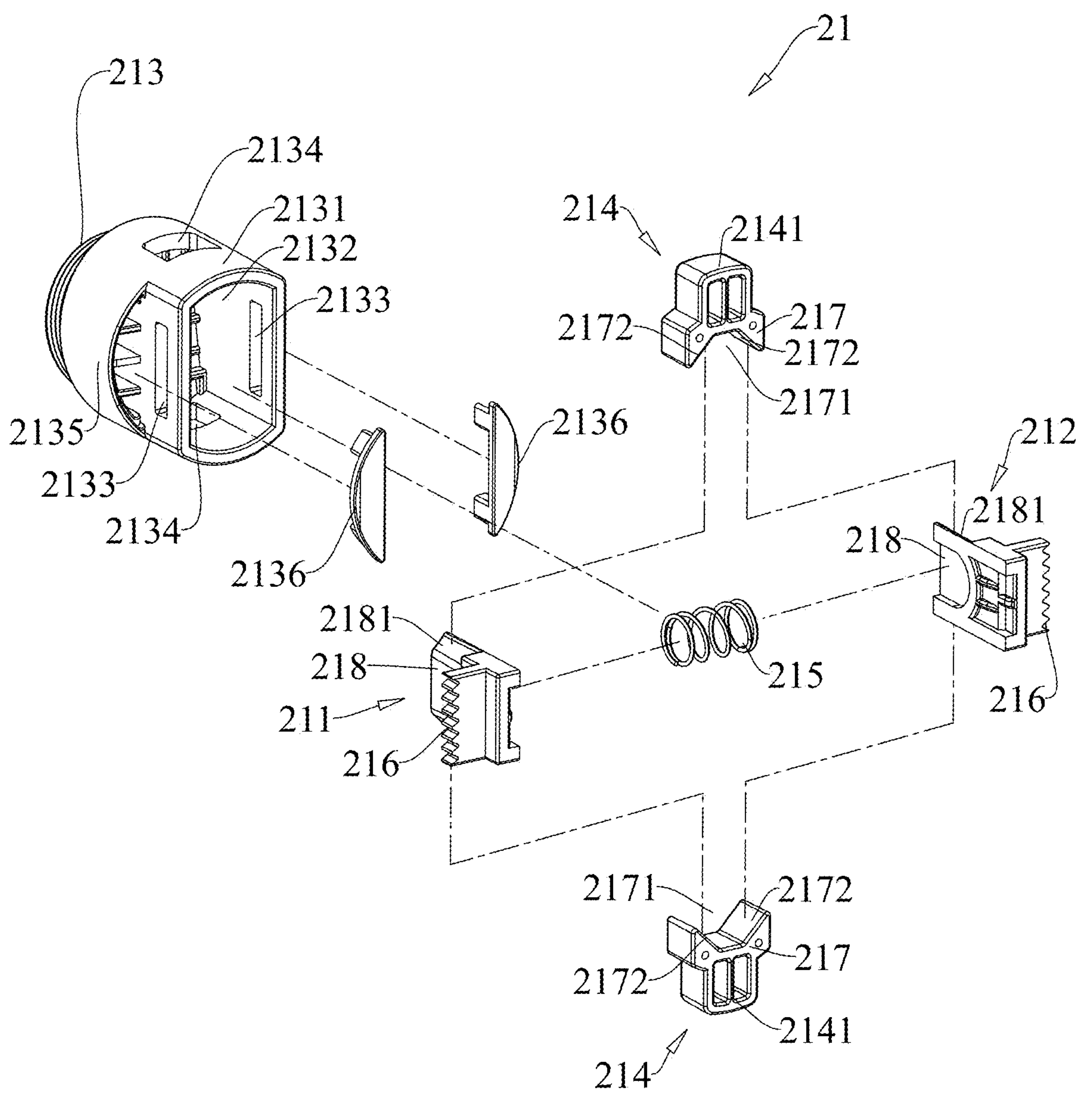
FIG. 5 is an exploded view of a paired engagement structure according to an embodiment of this application.

As shown in FIG. 4 and FIG. 5, in these embodiments, the paired engagement structure 21 includes a first engagement component 211 and a second engagement component 212 disposed opposite to each other, two such racks 31 are disposed opposite to each other in the adjustment slot 30, and the racks 31 extend vertically up and down.

In the locked state, the first engagement component 211 and the second engagement component 212 respectively engage with the two racks 31. In the unlocked state, the first engagement component 211 and the second engagement component 212 respectively move away from the racks 31 to synchronously release the at least two engagements.

Providing the first engagement component 211 and the second engagement component 212 that are in relative engagement can improve the positioning and fixing effect of the adjustment seat 20 with the adjustment slot 30.

Specifically, the paired engagement structure 21 further includes a sliding connection seat 213, two release buttons 214, and a locking spring 215.

The sliding connection seat 213 has a sliding connection block 2131 inserted and slidably connected in the adjustment slot 30, and the sliding connection block 2131 is located between the two racks 31 (as shown in FIG. 4), conducive to driving the sliding connection seat 213 to slide along the adjustment slot 30.

The first engagement component 211 and the second engagement component 212 are spaced apart and installed on two sides of the sliding connection block 2131 close to the racks 31, and are capable of reciprocating along a second direction between the sliding connection block 2131 and the racks 31, the second direction being perpendicular to the first direction. The second direction in these embodiments is described by taking a left-right direction as an example, but is certainly not limited thereto.

One side of the first engagement component 211 and one side of the second engagement component 212 that face away from each other are respectively provided with limiting teeth 216 movably engaging with the racks 31. One side of the first engagement component 211 and one side of the second engagement component 212 that face each other are provided with the locking spring 215, and the locking spring 215 provides an elastic force to separate the first engagement component 211 and the second engagement component 212, so that in a stationary state, the limiting teeth 216 of the first engagement component 211 and the limiting teeth 216 of the second engagement component 212 can both press against and engage with the racks 31 to achieve positioning and fixing of the adjustment seat 20.

The release buttons 214 are installed on a surface of the sliding connection seat 213 and have drive parts 217 linked to the first engagement component 211 and the second engagement component 212. When the release buttons 214 are pressed, the drive parts 217 drive the first engagement component 211 and the second engagement component 212 to approach each other. Thus, the release buttons 214 can be manually pressed to release the engagement between the limiting teeth 216 and the racks 31, so that the adjustment seat 20 can move up and down along the first direction.

In these embodiments, the two release buttons 214 are symmetrically disposed up and down and spaced apart at two ends of the first direction between the first engagement component 211 and the second engagement component 212, that is, upper and lower ends, for synchronously linking the first engagement component 211 and the second engagement component 212 to approach each other. Thus, during adjustment, it is only necessary to press and pinch the two release buttons up and down to easily and effortlessly drive the first engagement component 211 and the second engagement component 212 to overcome the elastic force of the locking spring 215 and approach each other, separating the limiting teeth 216 from the racks 31 to achieve unlocking.

In these embodiments, the sliding connection seat 213 may have a movement chamber 2132. The sliding connection block 2131 is provided with side openings 2133 communicating with the movement chamber 2132 along two sides (referring to left and right sides in these embodiments) of the second direction. One side of the sliding connection seat 213 away from the sliding connection block 2131 is provided with release openings 2134 communicating with the movement chamber 2132 along two sides (referring to upper and lower sides in these embodiments) of the first direction.

The first engagement component 211 and the second engagement component 212 are both installed in the movement chamber 2132 and have the respective limiting teeth 216 protruding from the two side openings 2133. The first engagement component 211 and the second engagement component 212 respectively have component bodies 218 limited in the movement chamber 2132. The locking spring 215 is disposed between the two component bodies 218, and two ends of each of the component bodies 218 along the first direction are respectively provided with guide inclined surfaces 2181.

The two release buttons 214 are both installed in the movement chamber 2132 and each include a button 2141 protruding from the release opening 2134 to the surface of the sliding connection seat 213 and the drive part 217 located in the movement chamber 2132. A notch 2171 is provided on a side of the drive part 217 close to the first engagement component 211 and the second engagement component 212, and left and right sides of the notch 2171 respectively have drive inclined surfaces 2172 that engage with the guide inclined surfaces 2181.

Thus, when the buttons 2141 protruding above and below the adjustment part sliding connection seat 213 are pressed, the upper and lower drive parts 217 move relatively close along the first direction. The four drive inclined surfaces 2172 of the upper and lower notches 2171 engage with the four guide inclined surfaces 2181 to drive the first engagement component 211 and the second engagement component 212 on the two sides of the second direction to approach each other relatively.

Figure 2:
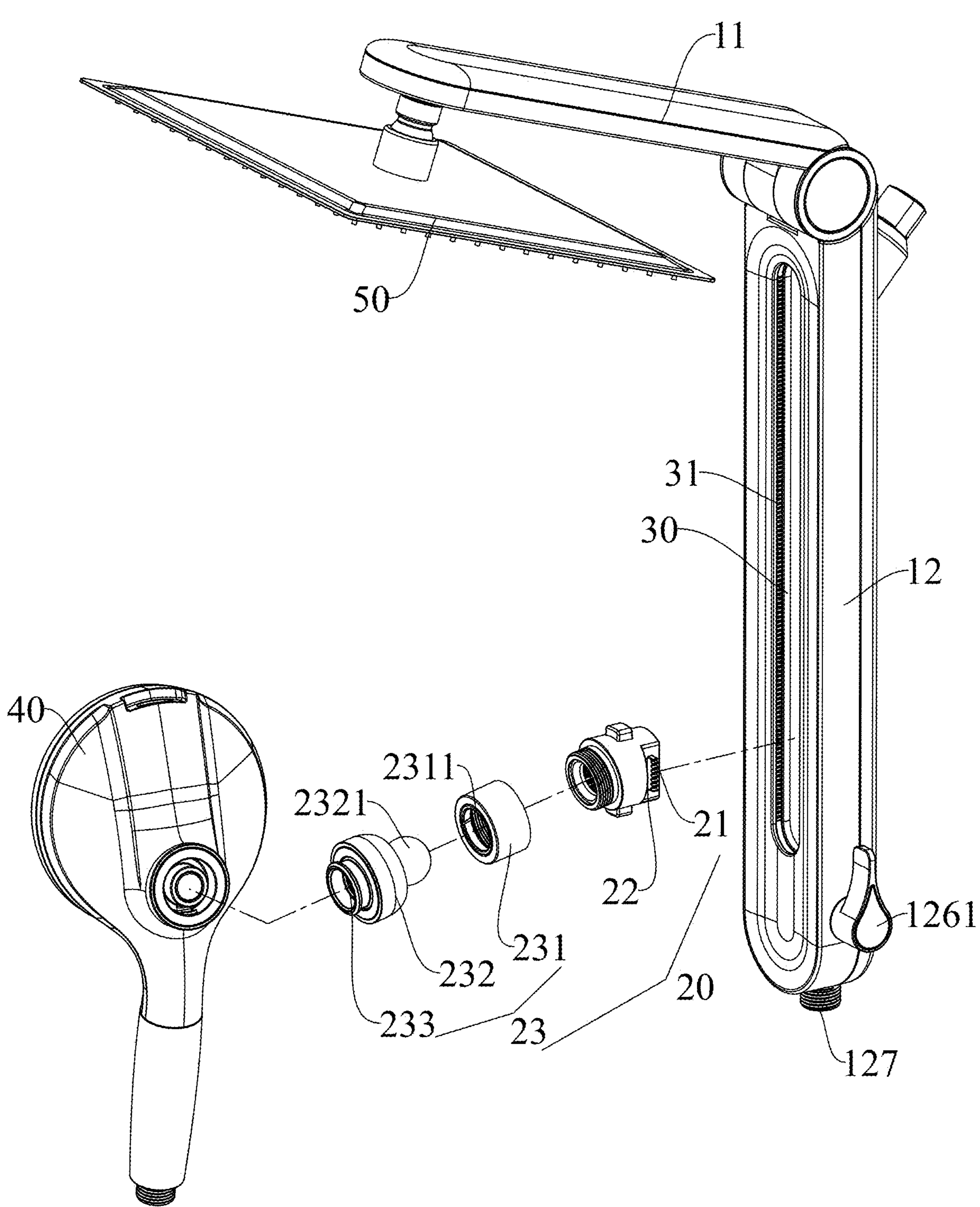
FIG. 2 is a partial exploded view according to an embodiment of this application.
Figure 3:
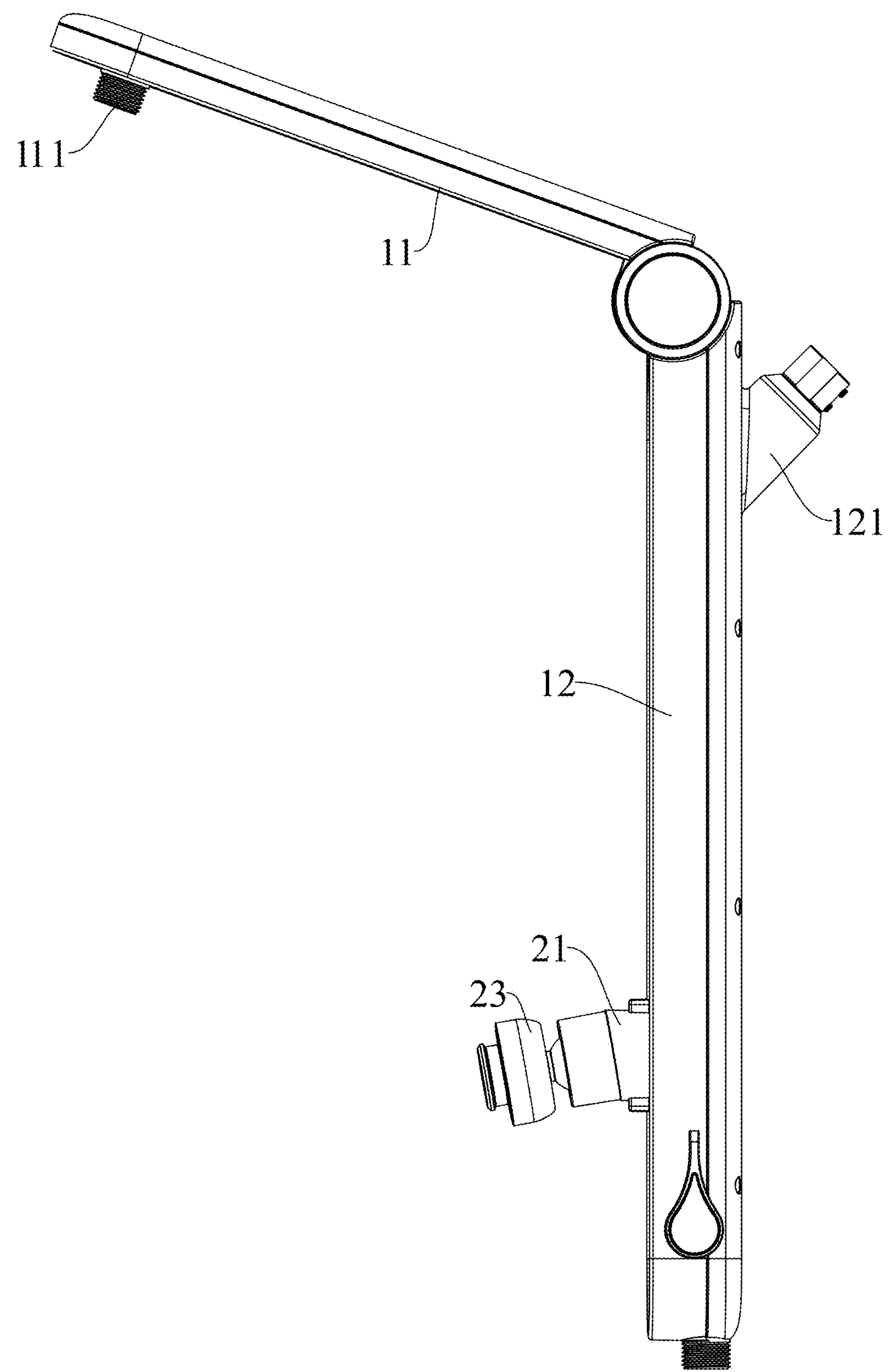
FIG. 3 is a right view according to an embodiment of this application.

As shown in FIG. 2, FIG. 4, and FIG. 5, the open side of the adjustment slot 30 forms a limiting guide edge 32 and slidably connects with a limiting slot 22 in the adjustment seat 20 to prevent the adjustment seat 20 from detaching outward in a direction away from the adjustment slot 30. This can improve the convenience and reliability of adjusting the adjustment seat 20, making use more convenient.

Specifically, the limiting teeth 216 of the first engagement component 211 and the limiting teeth 216 the second engagement component 212 respectively form the limiting slots 22 with left and right protrusions 2135 on a front side of the sliding connection seat 213 away from the sliding connection block 2131, and a friction pad 2136 may also be installed on a rear side of the protrusion 2135.

As shown in FIG. 2, a side of the adjustment seat 20 away from the paired engagement structure 21 in these embodiments is provided with a showerhead connection part 23, and the showerhead connection part 23 includes a fixed seat 231, a movable head 232, and a magnetic attraction assembly 233.

The fixed seat 231 has one side detachably connected to a side of the paired engagement structure 21 away from the adjustment slot 30, and the two can be connected by threads. The other side of the fixed seat 231 has a movement hole 2311. One side of the movable head 232 is provided with a ball head 2321, and the ball head 2321 is rotatably assembled in the movement hole 2311. The other side of the movable head 232 is installed with the magnetic attraction assembly 233, and the magnetic attraction assembly 233 is configured to movably attract and fix the showerhead 40.

Thus, the showerhead connection part 23 can flexibly attract and fix the showerhead 40 through the magnetic attraction assembly 233, and with the engagement between the ball head 2321 and the movement hole 2311, the angle of the showerhead 40 can be conveniently adjusted to provide multiple water outlet angles.

Certainly, the showerhead connection part 23 may be a common structure such as a "C" shaped showerhead seat (not shown in the figure), and is not limited to these embodiments. The cooperation structure of the magnetic attraction assembly 233 and the showerhead 40 may refer to the prior art.

Figure 6:
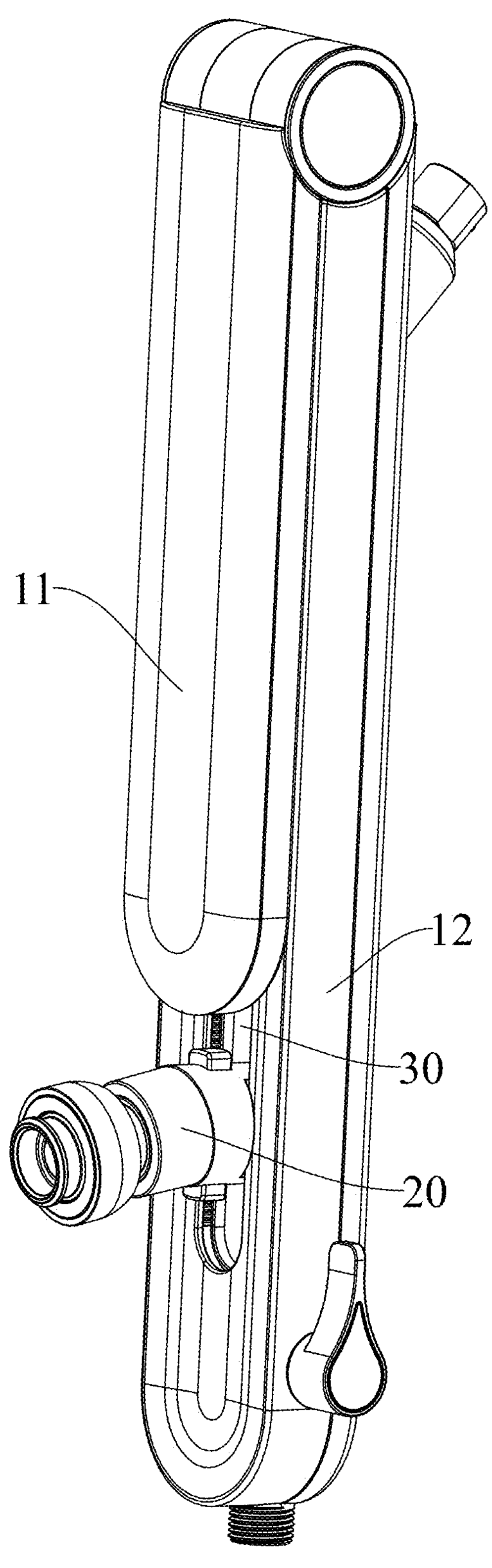
FIG. 6 is a schematic diagram of a folded state according to an embodiment of this application.
Figure 7:
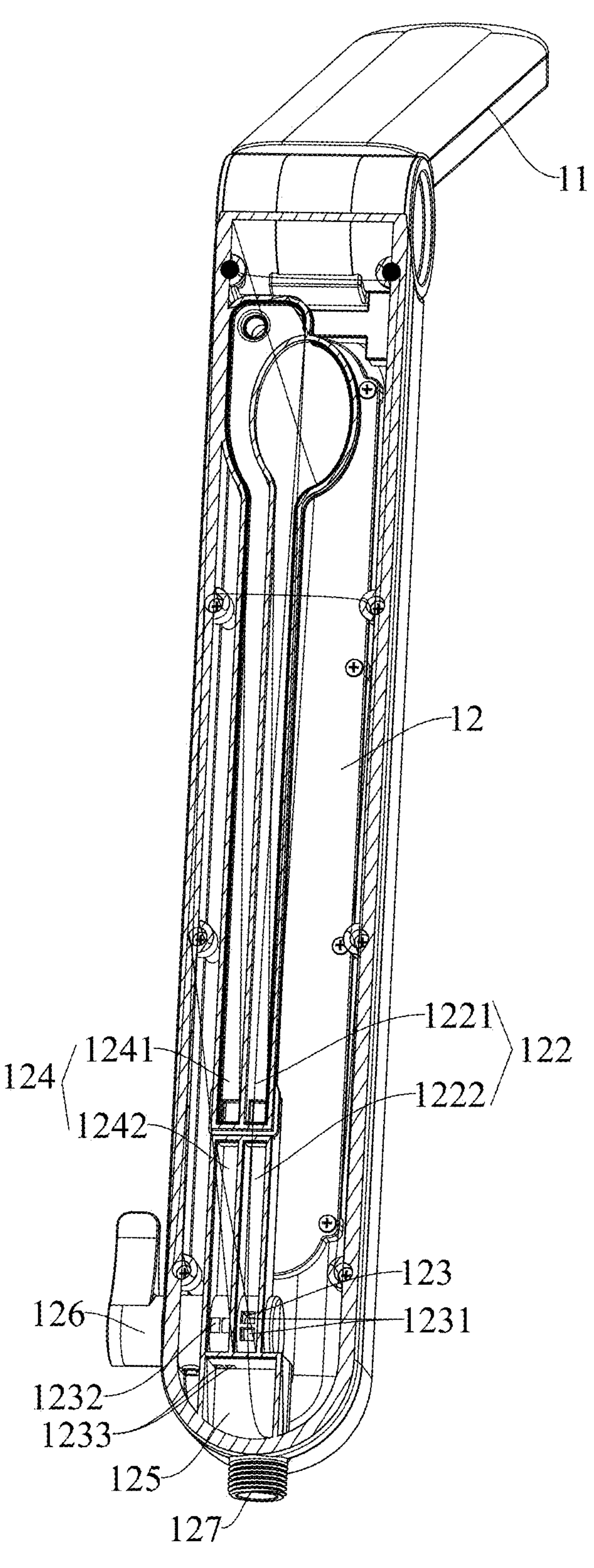
FIG. 7 is a perspective cross-sectional view according to an embodiment of this application, showing an internal waterway structure.

As shown in FIG. 1, FIG. 2, and FIG. 6, the support arm body 10 may include a first support arm 11 and a second support arm 12. One end of the first support arm 11 and one end of the second support arm 12 are hinged to each other. The two can be relatively unfolded or folded to reduce the overall size of the shower support arm assembly, facilitating packaging and transportation.

The other end of the first support arm 11 away from the second support arm 12 is provided with a top spray connection port 111. The top spray connection port 111 can be a threaded interface and can be used to screw and fix a top spray 50, facilitating extended support for the top spray 50. The adjustment slot 30 is disposed in the second support arm 12, and a sliding adjustment seat 20 is disposed in the adjustment slot 30, which can be used to fix the showerhead 40.

In these embodiments, the width of the top spray connection port 111 of the first support arm 11 may not be greater than the width of the adjustment slot 30, and the length of the first support arm 11 may be less than the length of the second support arm 12. This can allow the first support arm 11 to be completely buckled on the front surface of the second support arm 12 after folding, making product packaging and transportation more convenient.

Referring to FIG. 7 to FIG. 10, an upper end of the second support arm 12 is hinged to one end of the first support arm 11, and a top waterway 112 communicating with the top spray connection port 111 is disposed inside the first support arm 11 to supply water to the top spray 50. In these embodiments, the upper end of the second support arm 12 is hinged to one end of the first support arm 11. The first support arm 11 can be folded downward relative to the second support arm 12 or flipped open downward and maintained at a predetermined angle to achieve position adjustment of the top spray 50.

A protruding water inlet base 121 is provided on a rear side of an upper part of the second support arm 12, and the water inlet base 121 is used to connect with a wall water inlet pipe (not shown in the figure) to supply water to the shower support arm assembly. At the same time, the shower support arm assembly of these embodiments can achieve connection and fixation with the wall only through the water inlet base 121, and maintain a spacing with the wall, making installation simple and convenient.

The second support arm 12 is further provided with an inlet waterway 122, a waterway switching chamber 123, a first waterway 124, and a second waterway 125 therein. The inlet waterway 122 enables communication between the water inlet base 121 and the waterway switching chamber 123. The waterway switching chamber 123 is disposed in a lower part of the second support arm 12 and is installed with a switching control valve 126. The switching control valve 126 rotates to control the waterway switching chamber 123 to simultaneously communicate with the first waterway 124 and the second waterway 125 or selectively communicate with the first waterway 124 or the second waterway 125. The first waterway 124 communicates upward with the top waterway 112. The second waterway 125 communicates with a lower water outlet 127 disposed in the lower part of the second support arm 12.

The lower water outlet 127 can be connected in communication with the showerhead 40 fixed on the adjustment seat 20 through a hose 60. Thus, the shower support arm assembly of these embodiments can switch the communication between the inlet waterway 122 and the first waterway 124 or the second waterway 125 through the switching control valve 126 disposed in the lower part of the second support arm 12 to achieve water outlet from the top spray 50 or the showerhead 40, and can also control simultaneous water outlet from the top spray 50 and the showerhead 40 through the switching control valve 126. Since the switching control valve 126 is disposed in the lower part of the second support arm 12, switching is more smooth and convenient, facilitating use by people of shorter height.

Moreover, in these embodiments, various waterways are formed in the second support arm 12 and the first support arm 11, which can omit most peripheral pipe fittings, making the appearance more concise, beautiful, and practical.

The first waterway 124 and the top waterway 112 can communicate through the interior of the hinged end of the first support arm 11 and the second support arm 12. The internal structure of the hinged end can refer to the prior art, and its specific structure will not be repeated here.

Figure 8:
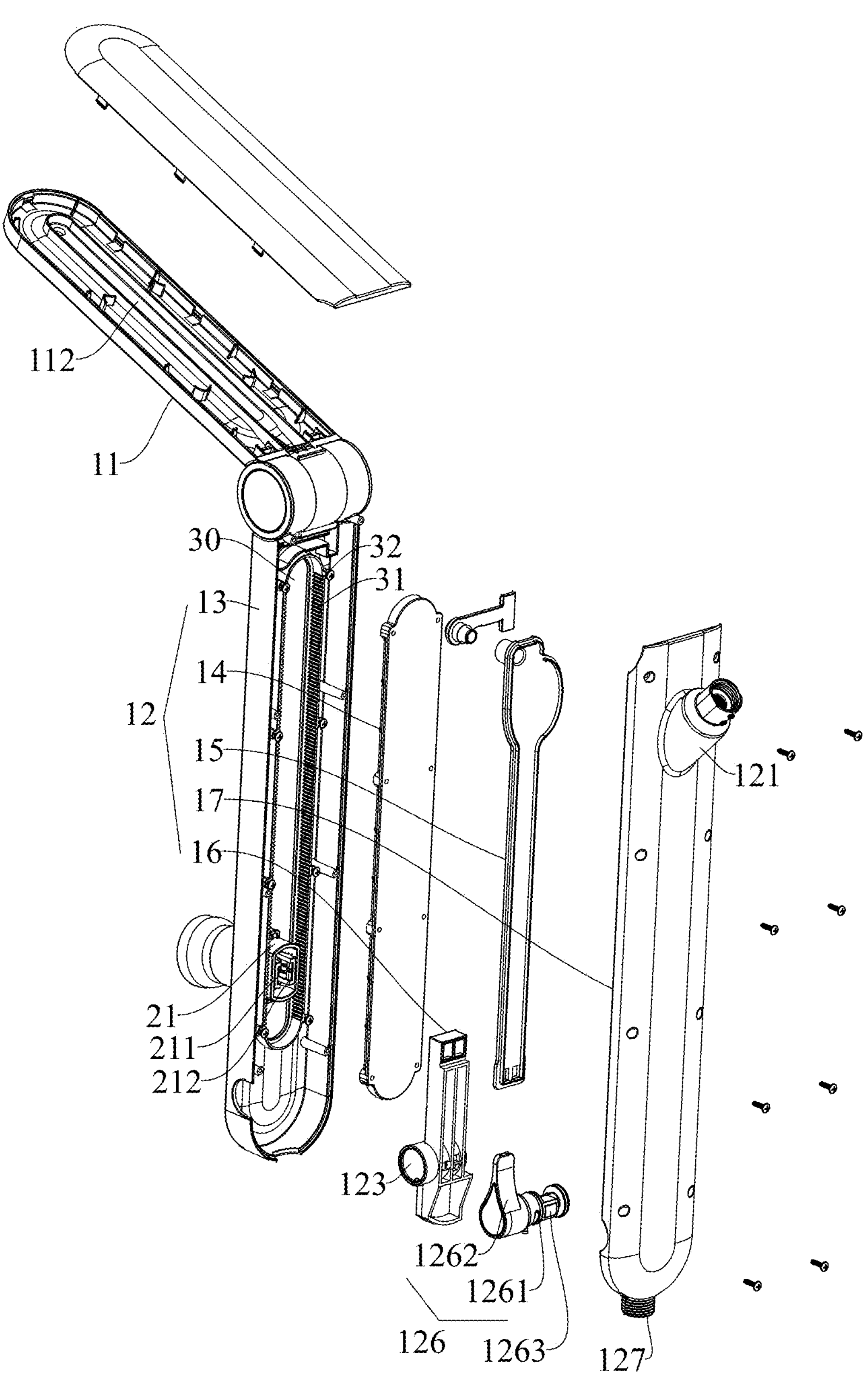
FIG. 8 is an exploded view according to an embodiment of this application.
Figure 9:
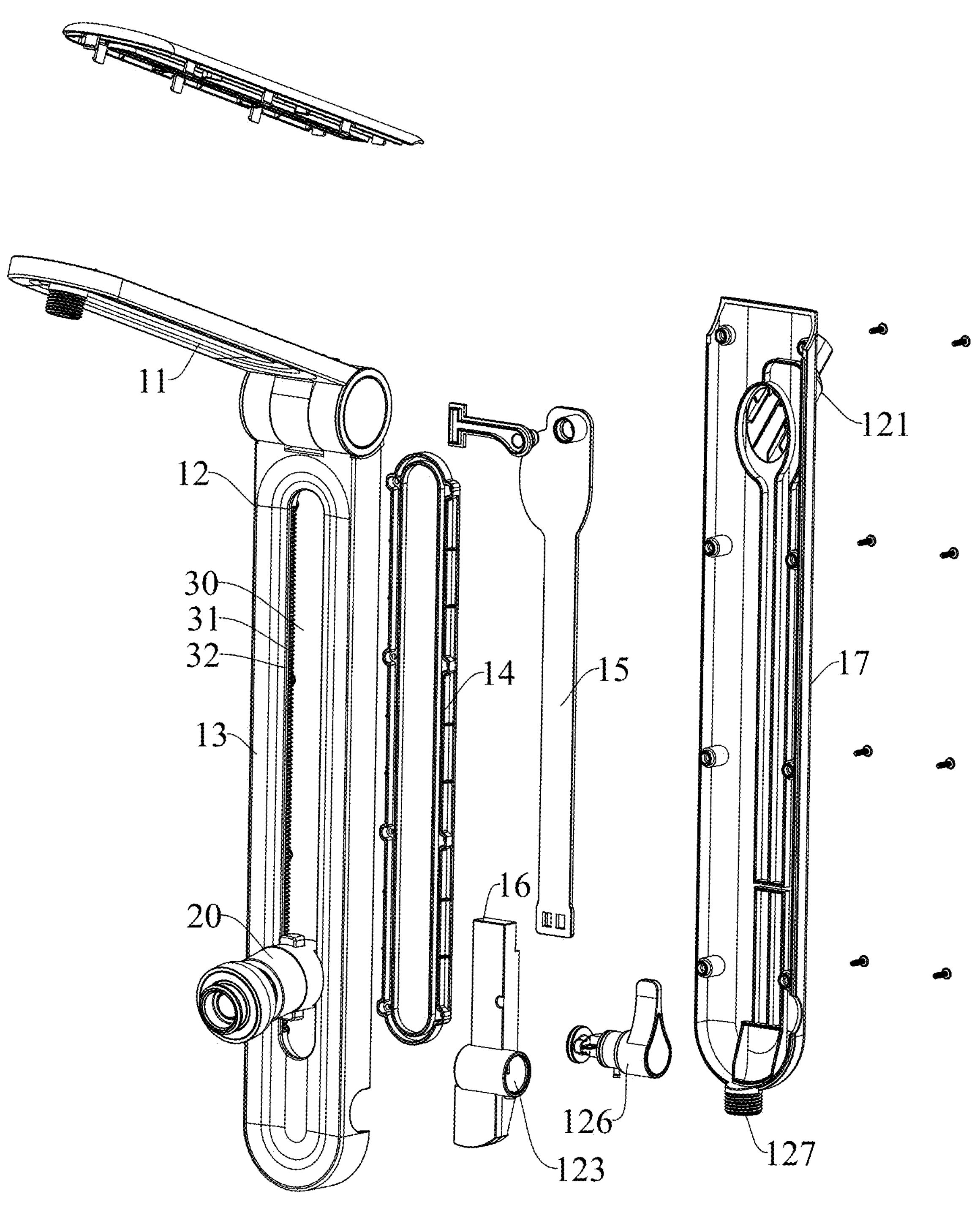
FIG. 9 is another exploded view according to an embodiment of this application.
Figure 10:
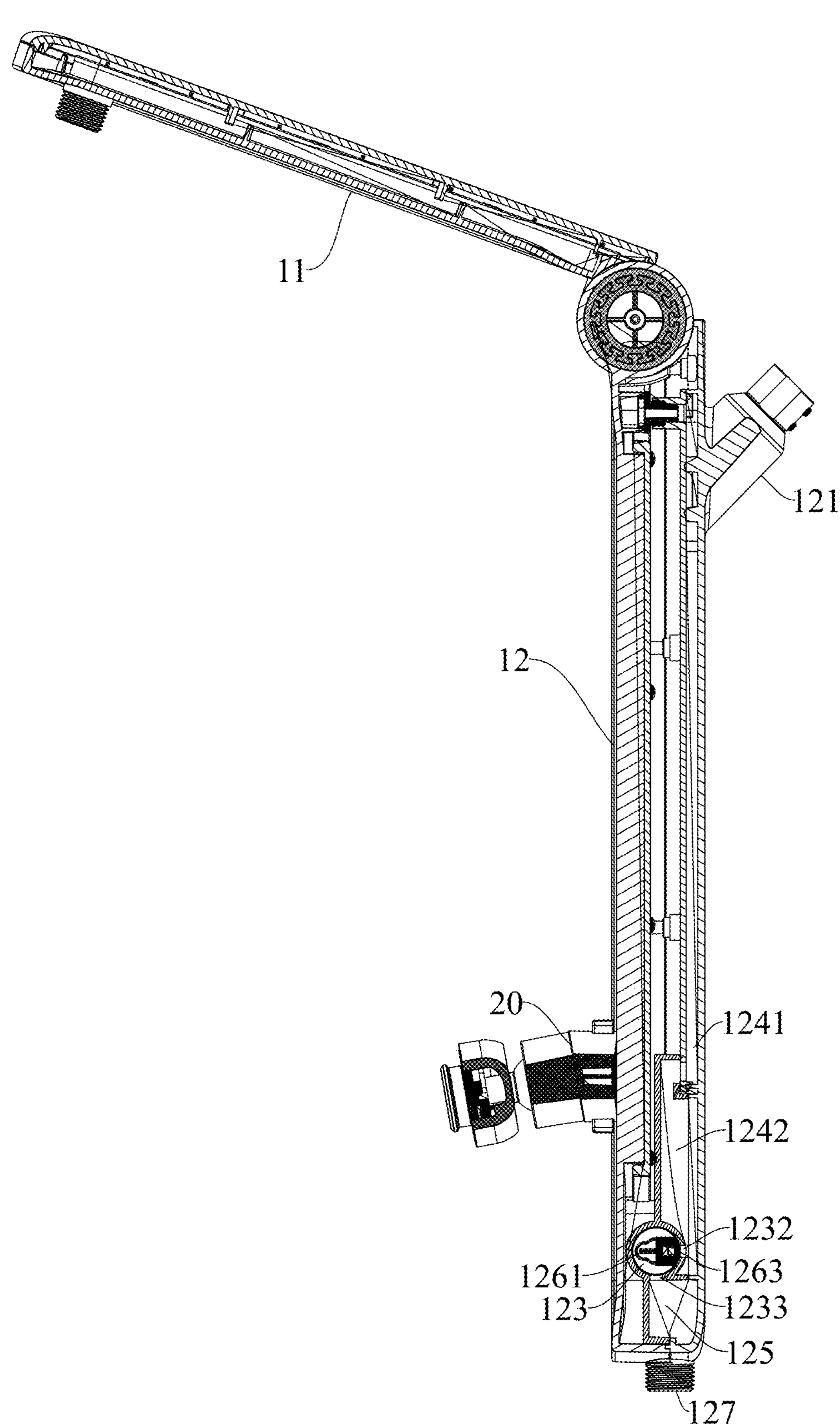
FIG. 10 is another cross-sectional view according to an embodiment of this application.

As shown in FIG. 8 and FIG. 9, the second support arm 12 may include a front shell 13, an adjustment slot bottom plate 14, a waterway connection plate 15, a waterway connection part 16, and a rear cover plate 17.

A front side of the front shell 13 is provided with the adjustment slot 30, the adjustment slot bottom plate 14 covers and seals a rear side of the adjustment slot 30, and the adjustment slot bottom plate 14 may be connected by screw locking. The racks 31 may be integrally formed on the left and right sides of the adjustment slot 30, thereby being fixed in the adjustment slot 30 to form fixed elements.

The waterway connection plate 15 and the waterway connection part 16 are connected up and down and installed on a front side of the rear cover plate 17. The rear cover plate 17 covers a rear side of the front shell 13 and encloses the waterway connection plate 15 and the waterway connection part 16. The waterway connection plate 15 and the waterway connection part 16 can be welded to the rear cover plate 17 to ensure the sealing of the formed waterways.

Specifically, an upper inlet waterway 1221 and an upper first waterway 1241 extending up and down and separated left and right can be formed between the rear cover plate 17 and the waterway connection plate 15. A lower inlet waterway 1222 and a lower first waterway 1242 extending up and down and spaced left and right are formed between the rear cover plate 17 and the waterway connection part 16. The upper inlet waterway 1221 and the lower inlet waterway 1222 communicate to form the inlet waterway 122, and the upper first waterway 1241 and the lower first waterway 1242 communicate to form the first waterway 124. By means of providing the independent waterway connection plate 15 and waterway connection part 16, product manufacturing and assembly can be facilitated, and internal connecting pipe fittings can be omitted, resulting in fewer assembly processes and higher production efficiency.

The waterway switching chamber 123 and the second waterway 125 located below the waterway switching chamber 123 are also disposed in the waterway connection part 16. The waterway switching chamber 123 has a first hole 1231, a second hole 1232, and a third hole 1233 that respectively communicate with the lower inlet waterway 1222, the lower first waterway 1242, and the second waterway 125, where the second hole 1232 and the third hole 1233 are spaced apart along a circumferential direction of the waterway switching chamber 123 (referring to FIG. 10).

The switching control valve 126 includes a valve body 1261 and a switch 1262. The valve body 1261 is rotatably installed in the waterway switching chamber 123. The switch 1262 is installed on a surface of the second support arm 12 and connected to the valve body 1261. A circumferential wall of the valve body 1261 has a sealing part 1263 that movably blocks the second hole 1232 and the third hole 1233.

Thus, by means of rotating the switch 1262, the valve body 1261 can be driven to rotate, allowing the sealing part 1263 to selectively block the second hole 1232 or the third hole 1233, or open the second hole 1232 and the third hole 1233 simultaneously, so that the second hole 1232 and the third hole 1233 can simultaneously or selectively communicate with the first hole 1231, thereby selectively enabling communication of the inlet waterway 122, the first waterway 124, the top waterway 112, the top spray connection port 111, and the top spray 50, or enabling communication of the inlet waterway 122, the second waterway 125, the lower water outlet 127, the hose 60, and the showerhead 40. Switching can be performed according to user needs, making the use convenient.

The above descriptions are only preferred implementations of this application, and the protection scope of this application is not limited to the above embodiments. All technical solutions falling under the idea of this application belong to the protection scope of this application. It should be pointed out that for those of ordinary skill in the art, equivalent changes and modifications made without departing from the principle of this application should still fall within the protection scope of this application.

In the description of the embodiments of this application, it should be understood that the indicated orientation or positional relationships are based on the orientations or positional relationships shown in the drawings, or the orientations or positional relationships conventionally placed when the product of this application is used, or the orientations or positional relationships conventionally understood by those skilled in the art, and are only for the convenience of describing this application and simplifying the description, rather than indicating or implying that the referred device or element must have a specific orientation, be constructed and operated in a specific orientation, and therefore cannot be understood as a limitation on this application. In the description of this application, "multiple" and "several" mean two or more, unless otherwise clearly and specifically defined.

What is claimed is:

1. A shower support arm assembly, comprising:

a support arm body having an adjustment slot extending along a first direction;

a sliding adjustment seat disposed in the adjustment slot and capable of reciprocating along the first direction;

at least one rack disposed on an inner wall of the adjustment slot; and a paired engagement structure disposed on the adjustment seat, wherein in a locked state, an engagement of the paired engagement structure with the rack is achieved to position the adjustment seat, and in an unlocked state, the paired engagement structure is subjected to an operational action toward each other along the first direction, thereby moving away from the rack to release the engagement, thereby allowing the adjustment seat to move along the first direction.

2. The shower support arm assembly according to claim 1, wherein the paired engagement structure comprises a first engagement component and a second engagement component disposed opposite to each other, the at least one rack comprises two racks disposed opposite to each other in the adjustment slot, and the racks are fixed elements; and in the locked state, respective engagements of the first engagement component and the second engagement component with the two racks are achieved, and in the unlocked state, the first engagement component and the second engagement component respectively move away from the racks to synchronously release the at least two engagements.

3. The shower support arm assembly according to claim 1, wherein an open side of the adjustment slot forms a limiting guide edge and slidably connects with a limiting slot in the adjustment seat to prevent the adjustment seat from detaching outward in a direction away from the adjustment slot.

4. The shower support arm assembly according to claim 2, wherein the paired engagement structure further comprises a locking spring;

the first engagement component and the second engagement component are installed between the two racks and are capable of reciprocating along a second direction, the second direction being perpendicular to the first direction; and one side of the first engagement component and one side of the second engagement component that face away from each other are respectively provided with limiting teeth movably engaging with the racks, one side of the first engagement component and one side of the second engagement component that face each other are provided with the locking spring, and the locking spring provides an elastic force to separate the first engagement component and the second engagement component.

5. The shower support arm assembly according to claim 4, wherein the paired engagement structure further comprises two release buttons; and the two release buttons are symmetrically disposed up and down and spaced apart at two ends of the first direction between the first engagement component and the second engagement component, the release buttons have drive parts, and when the release buttons are pressed, the drive parts drive the first engagement component and the second engagement component to approach each other.

6. The shower support arm assembly according to claim 5, wherein the paired engagement structure further comprises a sliding connection seat, the sliding connection seat has a sliding connection block inserted and slidably connected in the adjustment slot, and the sliding connection block is located between the two racks;

the first engagement component and the second engagement component are spaced apart and installed on two sides of the sliding connection block close to the racks;

the sliding connection seat has a movement chamber, the sliding connection block is provided with side openings communicating with the movement chamber along two sides of the second direction, and one side of the sliding connection seat away from the sliding connection block is provided with release openings communicating with the movement chamber along two sides of the first direction;

the first engagement component and the second engagement component are both installed in the movement chamber and have the respective limiting teeth protruding from the two side openings, the first engagement component and the second engagement component respectively have component bodies limited in the movement chamber, the locking spring is disposed between the two component bodies, and two ends of each of the component bodies along the first direction are respectively provided with guide inclined surfaces; and the two release buttons are both installed in the movement chamber and each comprise a button protruding from the release opening to a surface of the sliding connection seat and the drive part located in the movement chamber, a notch is provided on a side of the drive part close to the first engagement component and the second engagement component, and left and right sides of the notch respectively have drive inclined surfaces that engage with the guide inclined surfaces.

7. The shower support arm assembly according to claim 1, wherein a side of the adjustment seat away from the paired engagement structure is provided with a showerhead connection part, the showerhead connection part comprises a fixed seat, a movable head, and a magnetic attraction assembly, the fixed seat has one side detachably connected to a side of the paired engagement structure away from the adjustment slot and the other side provided with a movement hole, one side of the movable head is provided with a ball head, the ball head is rotatably assembled in the movement hole, the other side of the movable head is installed with the magnetic attraction assembly.

8. The shower support arm assembly according to claim 1, wherein the support arm body comprises a first support arm and a second support arm, one end of the first support arm and one end of the second support arm are hinged to each other, the other end of the first support arm away from the second support arm is provided with a top spray connection port, and the adjustment slot is disposed in the second support arm.

9. The shower support arm assembly according to claim 8, wherein an upper end of the second support arm is hinged to one end of the first support arm, and a top waterway communicating with the top spray connection port is disposed inside the first support arm; and a rear side of an upper part of the second support arm is provided with a water inlet base, the second support arm is further provided with an inlet waterway, a waterway switching chamber, a first waterway, and a second waterway therein, the inlet waterway enables communication between the water inlet base and the waterway switching chamber, the waterway switching chamber is disposed in a lower part of the second support arm and is installed with a switching control valve, and the switching control valve rotates to control the waterway switching chamber to simultaneously communicate with the first waterway and the second waterway or selectively communicate with the first waterway or the second waterway, the first waterway communicates upward with the top waterway, and the second waterway communicates with a lower water outlet disposed in the lower part of the second support arm.

10. The shower support arm assembly according to claim 9, wherein the second support arm comprises a front shell, an adjustment slot bottom plate, a waterway connection plate, a waterway connection part, and a rear cover plate;

a front side of the front shell is provided with the adjustment slot, the adjustment slot bottom plate covers and seals a rear side of the adjustment slot, and the racks are integrally formed on left and right sides of the adjustment slot;

the waterway connection plate and the waterway connection part are connected up and down and installed on a front side of the rear cover plate, and the rear cover plate covers a rear side of the front shell and encloses the waterway connection plate and the waterway connection part;

an upper inlet waterway and an upper first waterway extending up and down and separated left and right are formed between the rear cover plate and the waterway connection plate, a lower inlet waterway and a lower first waterway extending up and down and spaced left and right are formed between the rear cover plate and the waterway connection part, the upper inlet waterway and the lower inlet waterway communicate to form the inlet waterway, and the upper first waterway and the lower first waterway communicate to form the first waterway;

the waterway switching chamber and the second waterway located below the waterway switching chamber are also disposed in the waterway connection part, and the waterway switching chamber has a first hole, a second hole, and a third hole that respectively communicate with the lower inlet waterway, the lower first waterway, and the second waterway, wherein the second hole and the third hole are spaced apart along a circumferential direction of the waterway switching chamber; and the switching control valve comprises a valve body and a switch, the valve body is rotatably installed in the waterway switching chamber, the switch is installed on a surface of the second support arm and connected to the valve body, and a circumferential wall of the valve body has a sealing part that movably blocks the second hole and the third hole.

11. The shower support arm assembly according to claim 1, wherein a back of the support arm body is integrally provided with a protruding water inlet base, and the water inlet base is connected to a wall water inlet pipe and fixes the support arm body.

12. A shower support arm assembly, comprising:

a support arm body having an adjustment slot extending along a first direction;

a sliding adjustment seat disposed in the adjustment slot and capable of reciprocating along the first direction;

at least one rack disposed on an inner wall of the adjustment slot; and a paired engagement structure disposed on the adjustment seat, wherein in a locked state, an engagement of the paired engagement structure with the rack is achieved to position the adjustment seat, and in an unlocked state, the paired engagement structure moves away from the rack to release the engagement, thereby allowing the adjustment seat to move along the first direction;

wherein the support arm body comprises a first support arm and a second support arm, one end of the first support arm and one end of the second support arm are hinged to each other, the other end of the first support arm away from the second support arm is provided with a top spray connection port, and the adjustment slot is disposed in the second support arm.

13. The shower support arm assembly according to claim 12, wherein an upper end of the second support arm is hinged to one end of the first support arm, and a top waterway communicating with the top spray connection port is disposed inside the first support arm; and a rear side of an upper part of the second support arm is provided with a water inlet base, the second support arm is further provided with an inlet waterway, a waterway switching chamber, a first waterway, and a second waterway therein, the inlet waterway enables communication between the water inlet base and the waterway switching chamber, the waterway switching chamber is disposed in a lower part of the second support arm and is installed with a switching control valve, and the switching control valve rotates to control the waterway switching chamber to simultaneously communicate with the first waterway and the second waterway or selectively communicate with the first waterway or the second waterway, the first waterway communicates upward with the top waterway, and the second waterway communicates with a lower water outlet disposed in the lower part of the second support arm.

14. The shower support arm assembly according to claim 13, wherein the second support arm comprises a front shell, an adjustment slot bottom plate, a waterway connection plate, a waterway connection part, and a rear cover plate;

a front side of the front shell is provided with the adjustment slot, the adjustment slot bottom plate covers and seals a rear side of the adjustment slot, and the racks are integrally formed on left and right sides of the adjustment slot;

the waterway connection plate and the waterway connection part are connected up and down and installed on a front side of the rear cover plate, and the rear cover plate covers a rear side of the front shell and encloses the waterway connection plate and the waterway connection part;

an upper inlet waterway and an upper first waterway extending up and down and separated left and right are formed between the rear cover plate and the waterway connection plate, a lower inlet waterway and a lower first waterway extending up and down and spaced left and right are formed between the rear cover plate and the waterway connection part, the upper inlet waterway and the lower inlet waterway communicate to form the inlet waterway, and the upper first waterway and the lower first waterway communicate to form the first waterway;

the waterway switching chamber and the second waterway located below the waterway switching chamber are also disposed in the waterway connection part, and the waterway switching chamber has a first hole, a second hole, and a third hole that respectively communicate with the lower inlet waterway, the lower first waterway, and the second waterway, wherein the second hole and the third hole are spaced apart along a circumferential direction of the waterway switching chamber; and the switching control valve comprises a valve body and a switch, the valve body is rotatably installed in the waterway switching chamber, the switch is installed on a surface of the second support arm and connected to the valve body, and a circumferential wall of the valve body has a sealing part that movably blocks the second hole and the third hole.

* * * * *